No. 777,118. PATENTED DEC. 13, 1904.
G. MACLOSKIE.
EMERGENCY BRAKE.
APPLICATION FILED MAR. 21, 1903.
NO MODEL. 2 SHEETS—SHEET 1.
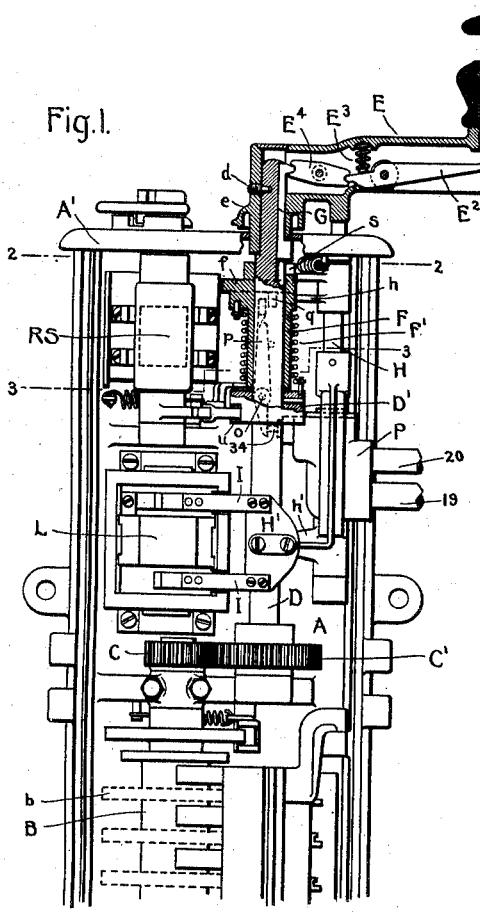
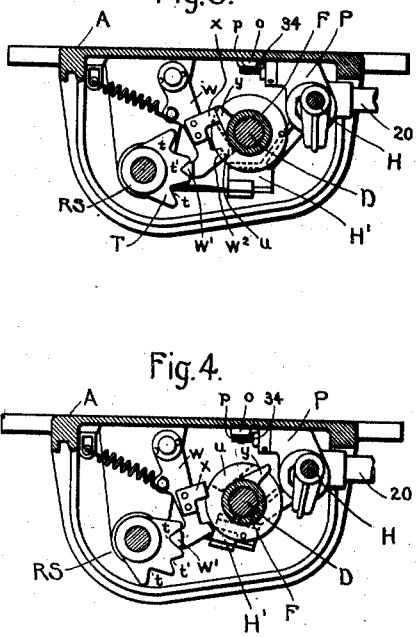
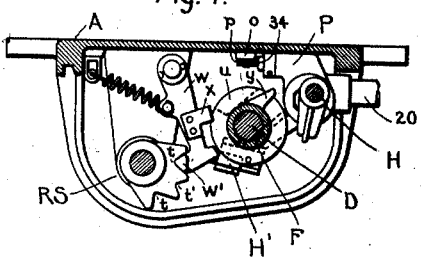
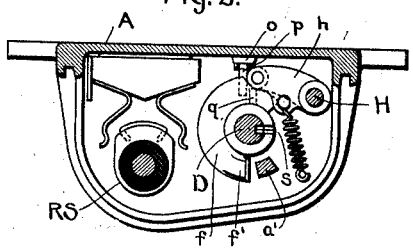
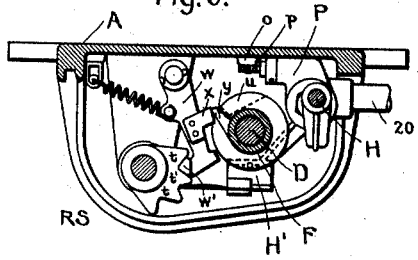
Witnesses.
J. Ellis Glenn.
Helen Oxford
Inventor.
George Macloskie,
by Allen H. Bean
Atty.

No. 777,118. PATENTED DEC. 13, 1904.
G. MACLOSKIE.
EMERGENCY BRAKE.
APPLICATION FILED MAR. 21, 1903.
NO MODEL. 2 SHEETS—SHEET 2.
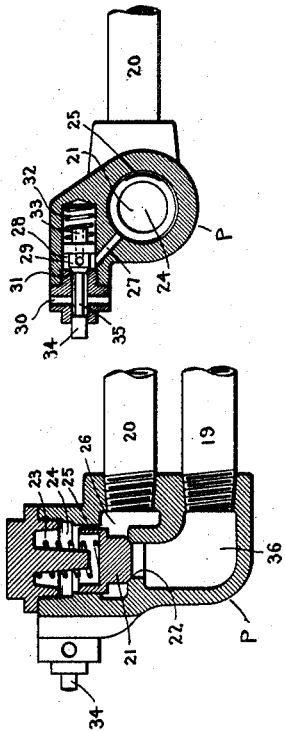
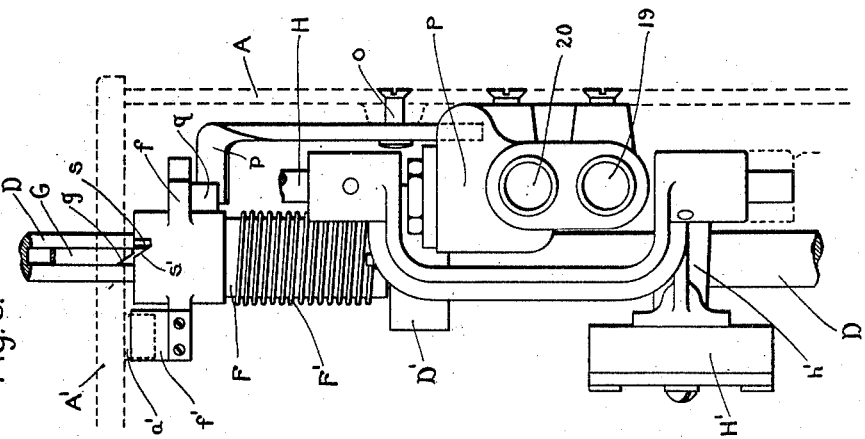
Witnesses.
J. Ellis Glenn.
Helen Oxford
Inventor.
George Macloskie
by
Atty.

No. 777,118.

Patented December 13, 1904.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

EMERGENCY-BRAKE.

SPECIFICATION forming part of Letters Patent No. 777,118, dated December 13, 1904.

Application filed March 21, 1903. Serial No. 148,911. (No model.)

*To all whom it may concern:*

Be it known that I, GEORGE MACLOSKIE, a citizen of the United States, residing at Schenectady, county of Schenectady, State of New York, have invented certain new and useful Improvements in Emergency-Brakes, of which the following is a specification.

My invention relates to improvements in means for automatically controlling motors and power-actuated brakes in case of an emergency, and is intended for use especially in connection with electrically-propelled vehicles or trains employing a braking system actuated by fluid-pressure.

The object of my invention is to prevent accident in case the motorman or operator while on duty on a car or train becomes incapacitated through sudden illness, death, or the like.

My invention is an improvement on the emergency device shown and described in the application of F. B. Corey, Serial No. 148,902, filed March 21, 1903. The said application discloses means for automatically opening the motor-circuit and applying the brakes whenever the controlling-handle is released by the motorman or operator in any of its operative positions. A movement of the controlling-handle into its "off" position causes the brakes to be released. With the device shown and described in said application it is possible for the motorman to become incapacitated and release the controlling-handle while the car is "coasting" with the controller in its off position without causing the brakes to be applied. My present invention obviates this difficulty and comprises means for causing the brakes to be applied when the controlling-handle, which may be the operating-handle for the motor-controlling switch or may be the operating-handle for the customary air-brake engineer's valve, is released in any of its positions and means operated from the controlling-handle for returning the brake-controlling means to an inoperative position to cause said brakes to be released.

The invention further consists of means operated when the reversing-switch is thrown into its off or neutral position for causing said brakes to be released if they have not already been released by the means operated from the controlling-handle and for locking the brake-controlling mechanism in position so that the controlling-handle can be released by the operator without causing the brakes to be applied.

In the accompanying drawings, which illustrate the preferred embodiment of my invention, Figure 1 is a front elevation of a specific form of controller to which my invention has been applied, the casing-cover being removed and certain parts being shown broken away and in section. Fig. 2 is a sectional plan view on the line 2 2, Fig. 1. Figs. 3, 4, and 5 are sectional plan views on the line 3 3 of Fig. 1, showing the emergency-valve-actuating mechanism in various operative positions. Fig. 6 is a side elevation of the emergency-valve-actuating mechanism, showing the means for resetting the said valve-actuating mechanism from the controlling-handle. Figs. 7 and 8 are sections through the preferred form of emergency-valve, and Fig. 9 is a diagrammatic representation of a "straight" air-brake system to which my invention may be applied.

Referring now to the drawings, A represents the back of a controller-casing, and E the operating-handle for the controller-cylinder B within said casing. The controller-cylinder B carries the usual contact-segments $b$ and is geared by cog-wheels C C' to a shaft D, which runs up into the hub $e$ of the operating-handle E. The hub is rotatable in an opening in the cap-plate A' of the casing and is fastened to the shaft D by means of the set-screw $d$. Rotatably mounted on the shaft D within the casing is a sleeve F, maintained yieldingly in its normal position by the helical spring F', which is connected at one end to the sleeve and at the other end to the shaft, preferably by means of the collar D', secured to said shaft. The sleeve F carries a cam $f$ and lug $f'$, (see Fig. 2,) the latter serving as a stop by abutting against a stationary lug $a'$ on the under side of the cap-plate.

Connected with the knob E' in the controlling-handle is a pin $e'$, which rests upon the long arm of the lever $E^2$, fulcrumed on the operating-handle E. A spring E³ bears on the short arm of the lever and keeps the pin and knob normally raised. A toothed rocker E⁴ also is fulcrumed on the operating-handle and engages with the short arm of the lever E². The other end of the rocker E⁴ engages with a lug on a bolt G, slidable in a keyway in the shaft D and adapted to enter a notch s in the upper end of the sleeve F and lock said sleeve to the shaft. This will occur whenever the knob E' is depressed, provided the controller is in its off position. The sleeve F is adapted to rotate with the shaft D so long as pressure is maintained on the broad knob E', on which the palm of the motorman's hand is adapted to rest while the controlling-handle is being operated.

Adjacent to the shaft D within the controller is a rock-shaft H, carrying an arm h, which bears against the cam f, as shown in Fig. 2, whereby the movement of said cam will rock the shaft H. Mounted on the rock-shaft H is an arm h', carrying a block of insulation H', on which are mounted two connected spring contact-fingers, which coöperate with stationary contacts and form therewith a double-pole switch I for closing and opening the power-circuit when the shaft H is rocked. The casing for the blow-out magnet of said switch is indicated by L.

Mounted within the controller-casing and operatively connected within the air-brake system is an emergency-valve, the casing of which is indicated by P, which is adapted to apply the brakes in case the controlling-handle is released in any position, including the off position, of the controller. To apply the brakes when the so-called "automatic" air-brake system is employed, the emergency-valve exhausts the train-pipe to atmosphere, and when the straight air-brake system is employed it connects the source of compressed-fluid supply to said train-pipe.

Although my invention is applicable to either of the systems above referred to, I have chosen to illustrate it in connection with the straight air-brake system, and in Fig. 9, 12 indicates the train-pipe which is connected to the air-brake cylinder 13 and is also connected, through the pipes 14 and 15, by way of the engineer's valve 16 and the storage-reservoir 17, to the source of compressed-fluid supply, here shown as a motor-driven air-compressor 18. The emergency-valve casing P is connected to the pipes 14 15 by means of the pipes 19 20, respectively.

The valve-casing P preferably contains two valves—a relay-valve 21 and a controlling-valve 29. The valve 21 is adapted to control the communication between the pipe 20 and the pipe 19, or, in other words, to control the communication between the source of compressed-fluid supply and the train-pipe when the straight air-brake system shown in Fig. 9 is employed. This valve 21 is adapted to rest upon the valve-seat 22 and is normally maintained on the said valve-seat by means of the compressed fluid from the source of compressed-fluid supply, assisted by the spring 23. The compressed fluid enters the chamber 24 above the valve 21 from the chamber 26 by way of the small passage-way 25 in said valve 21. The said valve 21 is adapted to be opened against the action of the spring 23 by pressure in the chamber 26 when the compressed fluid in the chamber 24 is exhausted to atmosphere by the operation of the controlling-valve 29. Communicating with the chamber 24 by means of the passage-way 27 is an auxiliary valve-chamber 28, containing the said valve 29. This valve 29 is normally maintained on its seat 31 by means of fluid-pressure, assisted by the spring 32. The compressed fluid enters the chamber 28 behind the piston attached to the valve 29 through the passage-way 33 in said valve 29. Attached to the valve 29 is a valve-spindle 34, having formed thereon an annular groove 35. When the spindle 34 is forced inwardly against the action of the spring 32, the chamber 24 is exhausted to atmosphere through the passage-way 27 and exhaust-port 30, and since the port or passage-way 25 in the valve 21 is small compared with the exhaust-port 30 the pressure in the chamber 26 will cause said valve to open against the action of the spring 23 and connect the pipe 20 with the pipe 19 through the chambers 26 and 36.

The mechanism for operating the emergency-valve will now be described.

Pivotally mounted on the back of the controller-casing at o is a lever p, the lower end of which is adapted to impinge the valve-spindle 34, and the upper end of which projects into the path of a lug q, carried on the under side of the cam f. This lug q is adapted to strike the upper end of said lever when the sleeve F is returned to its normal position by the spring F', thereby operating the emergency-valve to cause the brakes to be applied. In this construction the stop a' is so located that when the controlling-handle is in the position corresponding to the off position of the controller and the sleeve F is in its normal position, with the lug f' against the stop a', the slot s in said sleeve is out of alinement with the keyway in the controller-shaft in which the bolt G slides. To allow the emergency-valve to close to release the brakes, the sleeve F is rotated from its position with the lug f' against the stop a' to the position shown in Fig. 2. This movement is accomplished without causing the cut-out switch to be actuated to complete the motor-circuit. A depression of the knob E' when the controlling-handle is in its off position causes the lower end of the bolt G, which is beveled at g, (see Fig. 6,) to strike the beveled edge s' of the slot s in the sleeve F, and by the wedging action thus produced causes the said sleeve to rotate into such a position as to allow the emergency-valve to close. In order to lock the sleeve F in the position just referred to, so that when the controlling-handle is released the brakes will not be applied, I have constructed the interlocking mechanism between the movable member RS of the reversing-switch and the controller-shaft so that when the lever-arm $w$, constituting said interlocking device, is moved by the cam-plate T, carried by said member RS so that the projection $w'$, carried by said arm, moves from the recess $t$ into the recess $t'$, the lug $x$, carried by the arm $w$, engages the lug $y$, carried by the lower end of the sleeve F, and prevents the lug $q$ from striking the lever $p$.

In the operation of this controller and emergency-valve (assuming that the reversing-switch is in its neutral position) when the motorman places his hand upon the operating-handle he depresses the push-pin $e'$ and forces the bolt G down into the notch in the sleeve F. Then he throws the reversing-switch RS into one of its operative positions, either forward or backward, thus causing the projection $w'$, carried by the interlocking arm $w$, to move into either of the recesses $t$ from the recess $t'$, thereby removing the projection $w^2$ from the recess $u$ in the collar on the shaft and moving the locking-lug $x$ out of engagement with the lug $y$. The rotation of the handle operates, first, to close the cut-out switch I by operating the rock-shaft H through the agency of the sleeve F and the cam $f$ and then to control the motor-circuits by means of the controller-cylinder B. With the controlling-handle in its off position and the reversing-switch in its neutral position the sleeve F and the emergency-valve-actuating mechanism are locked in the position shown in Fig. 3 of the drawings, the projection $w^2$ engaging the recess $u$ and the lug $x$, carried by the arm $w$, engaging the lug $y$, carried by the sleeve F. When the controlling-handle is moved forward after the reversing-switch has been thrown into one of its operative positions (corresponding to the recesses $t$) and the sleeve F is locked to the shaft D by means of the bolt G, the valve-operating mechanism assumes the position shown in Fig. 4 of the drawings, with the projection $w'$ in the recess $t$ and the lugs $x$ and $y$ out of engagement with each other. When the controller-operating mechanism is in this position, the lug $q$ is out of engagement with the lever $p$. If at any time the motorman removes his hand from the handle E, the sleeve F is unlocked from the shaft D and the spring F' instantly turns the sleeve backward until the lug $f''$ strikes the stop $a'$ on the cap-plate and the lug $x$ engages the lug $y$. This position of the emergency-valve-actuating mechanism is indicated in Fig. 5. During this backward movement and just before the lug $f''$ reaches the stop $a'$ the lug $q$ engages the upper end of the lever $p$ and rocks said lever to open the emergency-valve.

It will be seen that with this construction the operation of the emergency-valve when the controlling-handle is released by the motorman while the reversing-switch is in either its forward or reverse position is independent of the position of the said controlling-handle, the mechanism operating when the handle is in the off position as well as when the handle is in any of its operative positions. In order to release the emergency-brakes, it is merely necessary for the operator or motorman to return the handle to the off position, if it is not there already, and then depress the knob E', thereby rotating the sleeve F by means of the wedging action between the bolt G and the side of the slot $s$, as above described.

It is often desirable to release the controlling-handle and leave the controller without causing the brakes to be applied by the operation of the emergency-valve. To accomplish this end and to render it necessary for the motorman to open the motor-circuit before he is able to release the controlling-handle, the locking device for the emergency-brake-actuating mechanism is constructed as above described, so that it may be operated when the reversing-switch is moved into its neutral position. When the reversing-switch is thrown into its neutral position after the brakes have been applied by the emergency-valve, the sleeve F is rotated by means of the engaging lugs $x$ and $y$, the lower end of said sleeve assuming the position shown in Fig. 3 and the upper end of said sleeve assuming the position shown in Fig. 2, with the lug $f''$ out of engagement with the stop $a'$ and the lug $q$ out of engagement with the lever-arm $p$.

The specific construction of the working parts of the controller herein shown and described forms no part of my present invention and is not herein claimed, since it forms the subject-matter of a copending application of F. E. Case, Serial No. 75,488, filed September 16, 1901, and is merely illustrated and described here to show how my invention may be applied to the type of controller generally employed as a master-controller in train-control systems. It will be readily understood that the invention is not limited in its application to any specific form of controller.

I have herein shown and described my invention as applied to the operating-handle of the motor-controller; but it will be well understood that the emergency-brake mechanism may be applied to the operating-handle of the ordinary engineer's valve of the air-brake system, thus allowing the said engineer's valve handle to operate as the controlling-handle for the emergency device.

I aim to cover in the claims hereto appended all modifications, both of the system and of the apparatus herein disclosed, which do not involve a departure from the spirit and scope of my invention.

What I claim as new, and desire to secure by Letters Patent of the United States, is—

1. In combination, a controlling-handle, a brake actuated by fluid-pressure, a valve for controlling the operation of said brake, means controlled from the handle when said handle is in any position for causing said valve to operate to apply the brake, and means operated from said handle when the latter is in a predetermined position for causing said valve to operate to release said brake.

2. In combination, a motor-reversing switch, means for actuating said reversing-switch, a controlling-handle, a brake actuated by fluid-pressure, a valve for controlling the operation of said brake, means for operating said valve to cause said brake to be applied when said handle is released by the operator, means controlled from said handle for operating said valve to release said brake, and means operated by the reversing-switch-actuating means for locking the valve-operating means in the latter position.

3. In combination, a controller, means for operating said controller, a power-actuated brake, means for causing said power-actuated brake to be applied if said controller-actuating means is released in any position of the controller, a reversing-switch, and means operated when said reversing-switch is operated for causing said brake to be released.

4. In combination, a controller, a controlling-handle, a brake actuated by fluid-pressure, a valve for controlling the operation of said brake, means for operating said valve to cause said brake to be applied when the controlling-handle is released by the operator, a reversing-switch, and means operated when the actuating mechanism for said reversing-switch is moved into its neutral position to operate said valve to cause the brake to be released.

5. In combination, a motor-controlling switch and a reversing-switch, handles for operating said switches, a brake actuated by fluid-pressure, a valve for controlling the application of said brake, means for operating said valve to cause said brake to be applied when the controlling-switch handle is released in any position, and means for rendering said valve-operating means inoperative when said reversing-handle is in a certain predetermined position.

6. In combination, a motor-controlling switch and a reversing-switch, handles for operating said switches, a brake actuated by fluid-pressure, a valve for controlling the application of said brake, means for operating said valve to cause said brake to be applied when the controlling-switch handle is released in any position, and means operated when the reversing-handle is moved into its neutral position for locking said valve-operating means in such a position that said controlling-switch handle may be released without causing said brake to be applied.

7. In combination, a motor-controller, a controlling-handle, a brake actuated by fluid-pressure, a valve for controlling the application of said brake, means for causing said valve to operate to apply said brake when the controlling-handle is released in any position, and means operated from said controlling-handle after said handle has been turned into the position corresponding to the "off" position of the controller for operating said valve to cause the brakes to be released.

8. In combination, a motor-controlling switch, a reversing-switch, handles for operating said switches, a brake actuated by fluid-pressure, a valve for controlling the application of said brake, means for causing said valve to operate to apply said brake when the controlling-switch handle is released in any position, means operated from said controlling-switch handle after said handle has been turned into the position corresponding to the "off" position of the controller for operating said valve to cause the brake to be released, and means operated by the reversing-switch handle for locking the valve-operating mechanism so that the controlling-switch handle may be released without causing the brake to be applied.

9. In combination, a controlling-handle, a brake actuated by fluid-pressure, a valve controlling the operation of said brake, a sleeve rotatably mounted on a shaft operatively connected with said handle, means normally tending to maintain said sleeve in a predetermined position and to return it when moved away from said position, means operated from said controlling-handle for locking said sleeve to said shaft, and means operated by said sleeve for actuating said valve when said locking means is released, said locking means being so constructed and arranged as to cause the brake to be released when a knob upon the controlling-handle is depressed while the said handle is in a predetermined position.

10. In combination, a motor-controller comprising a controlling-switch and a reversing-switch, a controlling-handle, a brake actuated by fluid-pressure, a valve for controlling the operation of said brake, a sleeve rotatably mounted on a shaft operatively connected with said handle, means normally tending to maintain said sleeve in a predetermined position and to return it when moved away from said position, means operated from the controlling-handle for locking said sleeve to the shaft, means carried by said sleeve for causing said valve to operate to apply the brake when the sleeve is unlocked upon the release of the controlling-handle, and means operated when the reversing-switch-actuating means is operated for locking said sleeve to allow the handle to be released without causing said brake to be applied.

11. In combination, a motor-controlling switch, a handle for operating said controlling-switch, a brake actuated by fluid-pressure, a valve for controlling the operation of said brake, a sleeve rotatably mounted on the controlling-switch shaft, means normally tending to maintain said sleeve in a predetermined position and to return it when moved away from said position, means operated from the controlling-switch handle for locking said sleeve to the controlling-switch shaft, means carried by said sleeve for causing said valve to operate to apply the brake when the sleeve is unlocked upon the release of the controlling-switch handle in any position of the controller, a reversing-switch-actuating mechanism, and means operated by the reversing-switch-actuating mechanism when the latter is moved into its neutral position for locking said sleeve so that the controller-handle can be released without causing the brake to be applied.

12. In combination, a device for regulating the application of power, an operating-handle therefor, brake-controlling means, means normally tending to operate said brake-controlling means, means controlled from the handle for preventing the operation of said operating means and for permitting the latter to operate when the handle is released in any position of the controller, and means operated from said handle for returning the operating means to its inoperative position.

13. In combination, a controlling-handle, brake-controlling means, means normally tending to operate said brake-controlling means, means for preventing the operation of said operating means and for permitting the latter to operate when the handle is released by the operator at any position of the controller, and means operated from said handle when the latter is in a predetermined position for rendering said brake-controlling means inoperative.

14. In combination, a controlling-handle, brake-controlling means, means for operating said brake-controlling means when the handle is released by the operator in any position of the controller, means controlled from said handle for returning said operating means to an inoperative position and for preventing the operation thereof, and means for locking said operating means in the last-mentioned position so that the handle can be released without affecting said operating means.

15. In combination, a controlling-handle, a brake-controlling valve, means for operating said valve when the handle is released by the operator in any position of the controller, means controlled from said handle for returning said valve-operating means to an inoperative position and for preventing its operation, and means for locking said valve-operating means in the last-named position so that the handle can be released without affecting said operating means.

16. In combination, a motor-reversing switch, means for actuating said reversing-switch, a controlling-handle, brake-controlling means, means for operating said brake-controlling means when the handle is released by the operator in any position of said handle, means controlled from said handle for returning the operating means to an inoperative position and for preventing its operation, and means operatively connected with the reversing-switch-actuating means for locking said valve-operating means in the last-mentioned position.

17. In combination, a motor-reversing switch, means for actuating said reversing-switch, a controlling-handle, a brake-controlling valve, means for operating said valve when the handle is released by the operator in any position of said handle, means controlled from said handle for returning said valve-operating means to an inoperative position and for preventing its operation, and means operatively connected with the reversing-switch-actuating means for locking said valve-operating means in said inoperative position.

18. In combination, a controller, means for operating said controller, brake-controlling means for causing a power-actuated brake to be applied if the controller-actuating means is released in any position of the controller, means controlled from said handle and rendered inoperative upon the release thereof for preventing the operation of said brake-controlling means, a reversing-switch, and means operated when the reversing-switch is moved into a predetermined position for moving the brake-controlling means into an inoperative position.

19. In combination, a motor-controlling switch, a reversing-switch, handles for operating said switches, a brake-controlling valve, means for operating said valve when the controlling-switch handle is released in any position, means controlled from said controlling-switch handle and rendered inoperative when the handle is released for preventing the operation of said brake-controlling valve, and means for rendering the said valve-operating means inoperative when the reversing-switch handle is in a certain predetermined position.

20. In combination, a motor-controller, a controlling-handle, a brake-controlling valve, means for operating said valve when the controlling handle is released in any position, and means controlled from said controlling-handle after the handle has been turned into the position corresponding to the "off" position of the controller for moving said valve-operating means into an inoperative position and for maintaining it in said inoperative position.

21. In combination, a controlling-handle, a brake-controlling valve, a sleeve mounted on a shaft operatively connected with said handle, means controlled from the handle for locking said sleeve to the shaft, means operatively connected with said sleeve for actuating the valve when the locking means is released, means normally tending to move said sleeve into a position to operate the valve, and means operated from the controlling-handle when the latter is in a predetermined position for moving said sleeve so as to render the valve-actuating means inoperative.

22. In combination, a controlling-handle, a sleeve mounted on a shaft operatively connected with said handle, a bolt operated and controlled from the handle for engaging a slot in said sleeve to lock the sleeve to the shaft, means operatively connected with said sleeve for actuating the valve when the bolt is removed from the slot, means normally tending to move said sleeve to cause the valve to be operated, the said bolt and slot in the sleeve being formed with inclined faces which coöperate when the bolt is forced into its locking position to cause the sleeve to be moved so as to render the valve-actuating means inoperative.

In witness whereof I have hereunto set my hand this 20th day of March, 1903.

GEORGE MACLOSKIE.

Witnesses:
BENJAMIN B. HULL,
HELEN ORFORD.